United States Patent Office 3,187,156
Patented June 1, 1965

3,187,156
CIRCUIT FOR CONTROLLING THE POWER OF INDUCTIVE HEATING OR MELTING EQUIPMENT
Gerhard W. Seulen, Friedrich W. Scheffler, and Leonhard Springob, Remscheid, Germany, assignors to Deutsche Edelstahlwerke Aktiengesellschaft, Krefeld, and Allgemeine Elektricitats-Gesellschaft, Berlin-Grunewald, Germany
Filed July 23, 1962, Ser. No. 211,709
Claims priority, application Germany, July 25, 1961, D 36,654
8 Claims. (Cl. 219—10.75)

The invention relates to circuits for controlling the power of inductive heating or melting equipment.

It is already known that the power output of inductive heating or inductive melting equipment can be controlled independently of the supply or bus bar voltage. To this end transformers with tapped primary and/or secondary windings are used and incorporated in the input circuit and sometimes in the oscillatory circuit of the equipment. Another known method consists in using variable reactors instead of transformers and in connecting these in series with the controlled equipment for the purpose of controlling the voltage and hence the power output. The reactors may be controlled either by tappings, by movable cores or by D.C. biasing. All these devices have the defect that the circuits are rather complex and that considerable losses occur in the form of Joulean heat and iron losses in the transformers and in the reactors.

The object of the present invention is the provision of a simple circuit for power control, which is free from the above mentioned drawback. The problem is solved by controlling the power output of inductive heating or melting equipment irrespectively of the supply or bus bar voltage by subdividing the equipment, which is compensated in conventional manner by a capacitor battery, into at least two groups. These groups may be formed by division at the electrical centre or by division outside the centre into equivalent electrical sections. At least one of these groups is associated with parallel capacitors which can be optionally connected therewith or disconnected therefrom.

Figure 1:
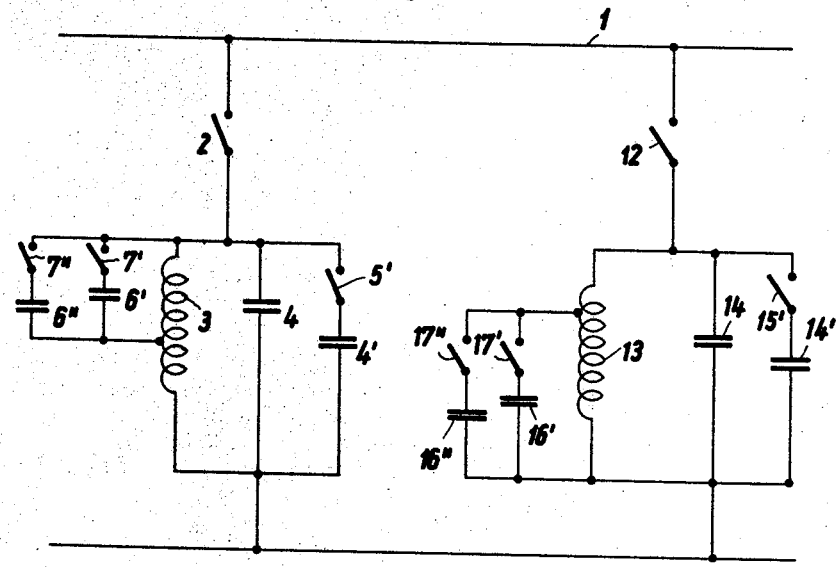
FIGURE 1 is a circuit having left and right sides which illustrate different embodiments of the invention with the inductor being differently divided into two groups.

In FIGURE 1, inductor 3 is supplied through switch means 2 from constant voltage bus bars 1, the inductor equipment being compensated in conventional manner by a battery of capacitors 4 connected in parallel with the equipment. For correctly adjusting the power factor switches 5′ permit capacitors 4′ to be added or disconnected. In order to control the power consumption of the inductor 3 at a constant supply voltage it is proposed to divide the inductor into two groups. Capacitors 6′ and 6″ are connectable across one of the groups. These capacitors can be optionally connected up by switches 7′ and 7″ according to the degree of power variation that is desired. A major number of capacitors may be provided, graduated in capacity stops of say 1, 2, 4, 8 etc. or 1, 1, 1.2, 2, 2 etc., in a manner which is well understood. Moreover, controllable capacitor units may be associated with the other half of the inductor equipment. However, in many cases it will be sufficient if controllable capacitors are associated with only one of the groups. On the right hand side of the circuit (in FIGURE 1) the division into two inductor groups is not symmetrical, the inductor equipment having been deliberately provided with a tapping outside the electrical centre. In this arrangement the power consumption of the equipment 13 which is supplied by the constant voltage bus bars 1 through switch means 12 can likewise be controlled within very wide limits. The fixed capacitors 14 as well as the disconnectable capacitors 14′, controlled by switches 15′, compensate the inductor equipment 13. Switches 17′ and 17″ connect and disconnect capacitors 16′ and 16″. At a constant bus bar voltage this permits the power consumption of the equipment to be varied within the limits required without affecting other inductors which are fed in parallel therewith.

In order to permit the supplementary capacitors 6 and 16 to be utilised to the best of advantage these may be controlled by two-way switches which permit them to be used optionally for compensating the oscillatory circuit or for controlling the power.

Figure 2:
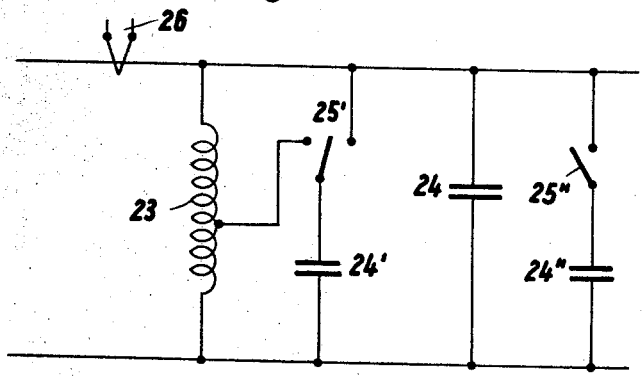
FIGURE 2 is a circuit illustrating the feature of this invention of utilizing supplementary capacitance for either compensating the oscillatory circuit or controlling the power according to this invention.

FIGURE 2 shows an arrangement of such a kind. The inductor equipment 23 is compensated by a battery of fixed capacitors 24 as well as by disconnectable capacitors 24′. The two-way switch 25′ permits the capacitors 24′ to be connected in parallel to the fixed capacitors 24 and hence parallel to the entire equipment 23. On the other hand, this switch can also be used to place the disconnectable capacitors 24′ across only one group of the equipment 23 which is divided into two series-connected groups. Naturally further disconnectable compensating capacitors, as indicated at 24″, may be provided, and placed in parallel with the battery of capacitors 24 by a switch 25″ as is already the practice. Corresponding plant may be provided with automatic power factor correction which irrespectively of the load ensures that the power factor on the input side of the oscillatory circuit, for instance at point 26, remains the same.

Figure 3:
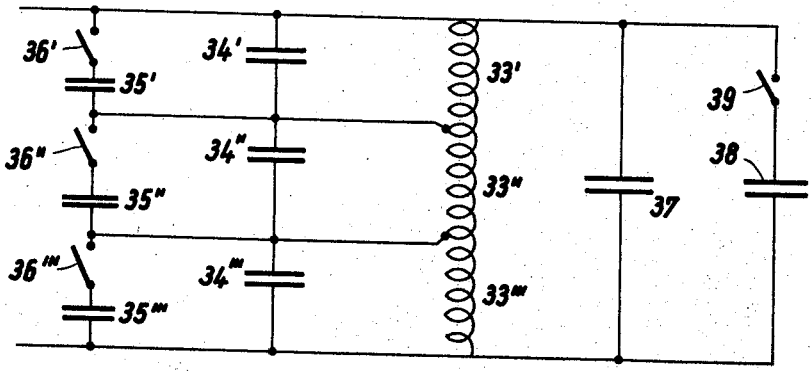
FIGURE 3 is a further circuit illustrating another embodiment of this invention in which the inductor is divided into more than two compensated groups.

FIGURE 3 is a circuit arrangement in which, according to the invention, the controlled equipment is divided into more than two groups, each associated, according to their division, with compensating capacitors placed in parallel therewith. The groups 33′, 33″ and 33‴ may be equal or of different size. The parallel capacitors 34′, 34″ and 34‴ are likewise equal if the associated groups 33 are equal. If the groups 33 are unequal then the capacitors 34 are likewise unequal in voltage and power. Capacitors 35 which can be selectably added permit the distribution of power to be controlled as desired. A common battery of compensating capacitors 37 with supplementary parallel disconnectable units 38 controlled by switches 39, permits the power factor in the supply network to be adjusted to any desired value.

Apart from permitting the power consumption of the controlled equipment to be controlled in fine steps the circuit arrangement according to the invention as the further advantage of being applicable to the control of the power density generated by the equiment. Regulation of power density is often desirable, for instance when inductively heating solids, such as small blocks or bar sections of steel, alloys or the like, which travel through an inductor, to impress upon such material a high power per unit surface area when it enters the inductor and a lower power per unit surface area when it leaves the inductor. In melting furnaces facilities for varying power density in different inductor regions, which the present invention permits, is a very great value. For instance, the movement of the bath can thus be easily controlled. Moreover, erosion of the crucible can be located at different selectable points with a view to prolonging the life of the crucible. Moreover, it is of great assistance to the metallurgical work if the specific power can be controllably varied and concentrated in given areas. Since the capacitors are connectable in selectable units the distribution of the specific power density can be controlled by extremely simple means without changing the geometry of the inductors or coils.

Figure 4:
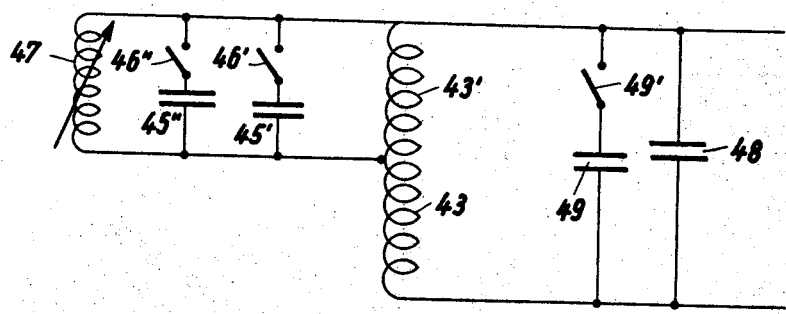
FIGURE 4 shows still another embodiment of this invention with a variable inductance in the supplementary circuit.

In cases in which it is desirable continuously to vary the power output or the distribution of power density at constant supply voltage a supplementary variable inductance 47 may be provided in the circuit arrangement according to FIGURE 4, said inductance being placed in parallel with capacitor 45' which is connected across one group 43' of the inductor equipment 43, and which is connectable and disconnectable by switch means 46'. Conveniently the magnetiude of this inductance is so chosen that the condition of resonance of the inductance in conjunction with capacitor 45' is satisfied. If the capacity of capacitor 45'' which is connectable and disconnectable by switch 46'' is twice that of capacitor 45', then any output, from capacity 0 to capacity 2, can be selected, since the variable reactor 47 corresponds with capacitor 45' when the latter is connected. Assuming now that reactor 47 is controlled down to approximately zero than capacitor 45' will be fully effective. If the capacity connected across group 43' must be further increased, then capacitor 45'' can be connected, capacitor 45' being disconnected, and at the same time the inductance of reactor 47 is raised to maximum value. The conditions of compensation will then equal 1, that is to say it will be the same as that obtaining when capacitor 45' in conjunction with reactor 47 were together adjusted to roughly zero. However, the reactor 47 can now be controlled down to 0 and the parallel capacitor 45'' will thus re-assume is full value 2. If capacitor 45' is now connected again (reactor 47 being fully effective), then the overall capacity of the control system comprising 45', 45'' and 47 can be continuously varied from 2 to 3. Instead of providing two capacitors 45' and 45'' in the ratio of 1:2, additional units, not shown in the drawing, for instance in a 4, 8, 16 etc. arrangement, together with the necessary switches could be included. A capacitor battery 48, possibly including supplementary units 49 connectable by switches 49', is always provided for power factor correction.

What we claim is:

1. A circuit arrangement for controlling the power of inductive heating or melting equipment independently of the supply or bus bar voltage, in combination with said equipment the improvement in said circuit comprising at least one capacitor connected across the equipment, said equipment being divided into at least two series-connected groups, and a plurality of second capacitors controllably connected in parallel across one of the said groups to sectionally control the power of said inductive equipment.

2. A circuit arrangement for controlling the power of inductive heating or melting equipment independently of the supply or bus bar voltage, in combination with said equipment the improvement in said circuit comprising a compensating battery of capacitors connected across the equipment, said equipment being divided into at least two series-connected groups, and a plurality of second capacitors of different capacities, each second capacitor being connected across one and one only of the said groups, and means for connecting or disconnecting at least certain of the said second capacitors in parallel across the respective group.

3. A circuit arrangement according to claim 2 in which the said second capacitors connected across a said group are of stepped graduated capacities.

4. A circuit arrangement according to claim 1, in which the capacitors connectible across a group are selectively connectible either for controlling the power circuit or for balancing the oscillatory system.

5. A circuit arrangement according to claim 4, comprising a two way switch operative so that the capacitors connected across a said group can be selectively connected across the entire equipment.

6. A circuit arrangement according to claim 1, having a variable inductance means connected across the capacitors which are connected across at least one of said groups.

7. A circuit arrangement according to claim 6 having means for simultaneously disconnecting or connecting the said variable inductance means and at least certain of the capacitors connected across the appertaining group.

8. A new use of control circuitry for heating and melting equipment which has inductive means, said circuitry including capacitor means connected across said inductive means to receive the full input voltage for compensating the equipment and second capacitor means connected across a portion of said inductive means, said new use being the regulation of power consumption by said equipment without varying said input voltage and including the step of sectionally controlling the power distribution and density of said inductive means by controlling the capacitance of said second capacitor means.

References Cited by the Examiner

UNITED STATES PATENTS 2,452,197 10/48 Kennedy _____ 219—10.75
2,570,311 10/51 Bohnet et al. _____ 219—10.75 X

FOREIGN PATENTS 1,262,479 4/61 France.

OTHER REFERENCES

Brown, Boveri, German application 1,090,352, printed Oct. 6, 1960, 2 pages spec., 1 sht. dwg.

RICHARD M. WOOD, *Primary Examiner*.